Sept. 30, 1952     P. BUISSON     2,611,964
APPARATUS FOR MEASUREMENTS BY VARIATION
OF ELECTRICAL CAPACITY
Filed Oct. 9, 1945     2 SHEETS—SHEET 1

INVENTOR
PIERRE BUISSON
ATTORNEY

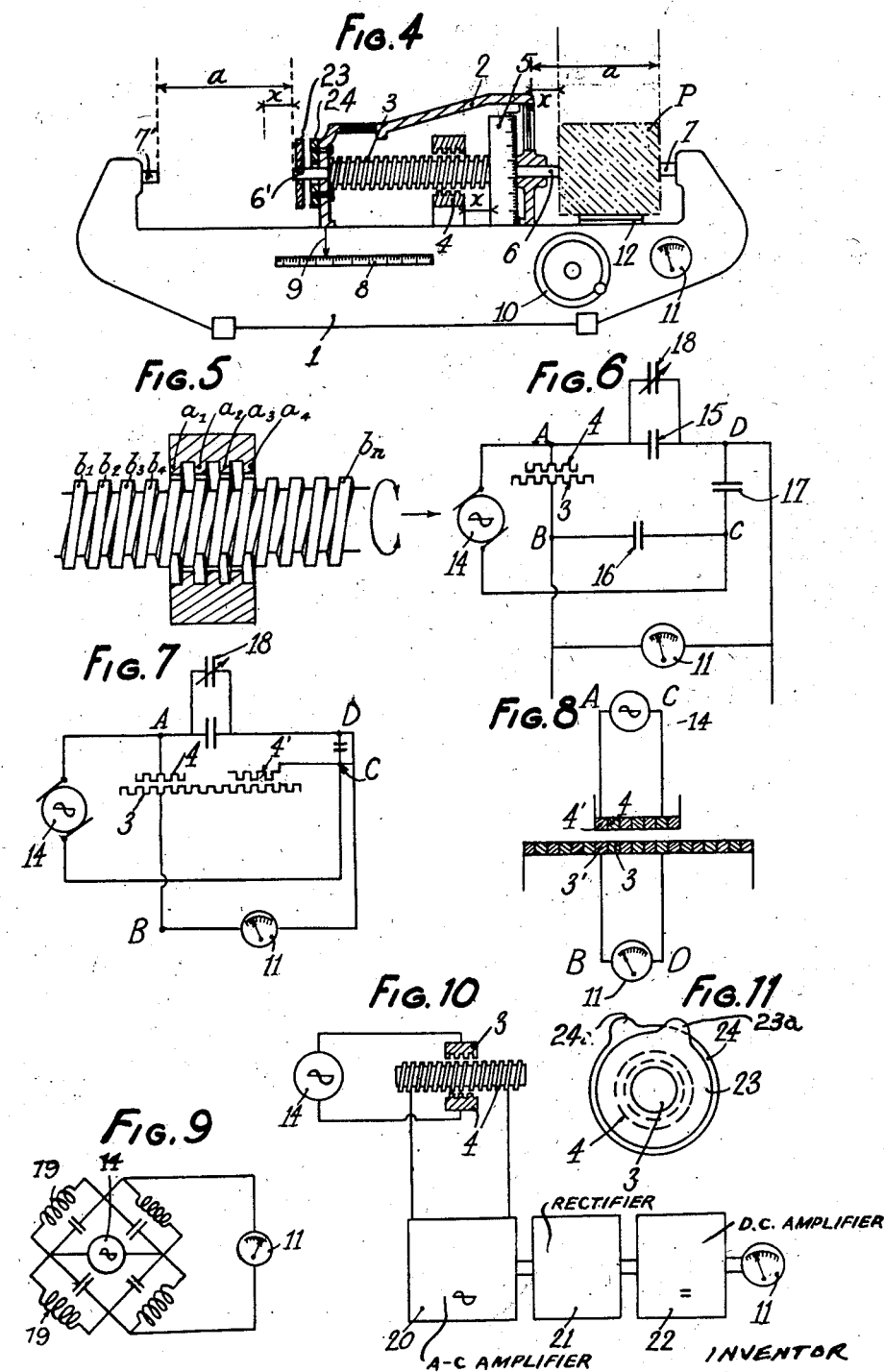

Patented Sept. 30, 1952

2,611,964

UNITED STATES PATENT OFFICE 2,611,964

APPARATUS FOR MEASUREMENTS BY VARIATION OF ELECTRICAL CAPACITY

Pierre Buisson, Vanves, France

Application October 9, 1945, Serial No. 621,344
In France October 7, 1944

14 Claims. (Cl. 33—147)

It has already been suggested to measure lengths of variations of lengths by measuring the corresponding electrical capacities or variations of capacities resulting from the space between two integral parallel electrodes respectively and the organs the distance of which it is desired to measure.

In the drawings accompanying this specification:

Fig. 4 is a diagrammatical view of an opposed contact measuring device embodying the invention, Fig. 5 is an enlarged view of the electrodes, Figs. 6–10 are wiring diagrams illustrating uses of the invention, Fig. 11 is a detailed view of a compensating or correcting device.

Figure 1:
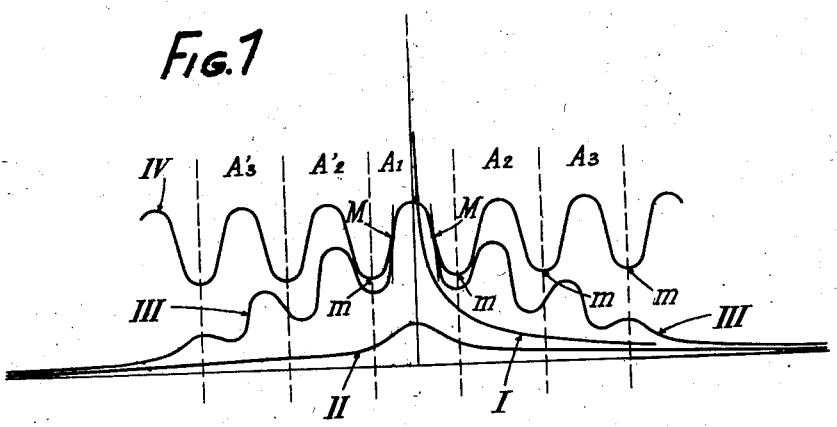
Fig. 1 is a group of curves relating to prior art devices.

In one of the known processes the two parallel electrodes are displaced one in relation to the other perpendicularly to their active surfaces. But it is known that the capacity of the two parallel electrodes or plates varies with the reciprocal of the space between the plates, so that the variations of capacity corresponding to a similar variation of spacing diminish very rapidly in terms of the total spacing (see curve I in Fig. 1 attached). In other words the accuracy of measurement defined by the slope of the tangent to the curve diminishes very rapidly as the distance between the electrodes increases. As a result such a process is not practically applicable except for measurements of very short length.

In another known process the parallel electrodes are displaced one in relation to the other parallel to their active surfaces. In this process the variation curve of the capacity in terms of the distance is symmetrical in relation to the position for which the two plates are rigorously opposite to one another and which corresponds to the maximum capacity but as is seen in curve II of Fig. 1 attached the accuracy of the measurement decreases also very rapidly on both sides of the median position when the length of measurement increases.

Figure 2:
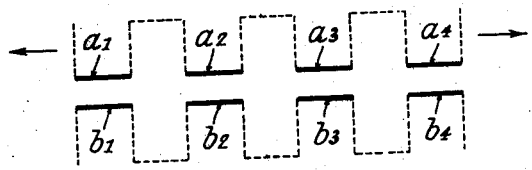
Fig. 2 is a schematic representation of prior art devices.

It is now suggested to replace the electrodes consisting of two continuous surfaces $a$ and $b$ by electrodes consisting of discontinuous surfaces comprising several elements of the same length $a_1, a_2, a_3, a_4 \ldots b_1, b_2, b_3, b_4 \ldots$ forming teeth or crenellations (see Fig. 2) which are also displaced parallel to one another. In this way a multiplication occurs, for each relative position of the electrodes, of the corresponding variation of capacity and thus accuracy is improved.

The variation curve of the capacity in terms of the distance has then the aspect of the curve III, but it will be noted that the increase in accuracy is only obvious in the zone A corresponding to the position for which all the surfaces $a$ and $b$ are opposite, and decreases very rapidly in the zones $A_2, A_3 \ldots A'_2, A'_3 \ldots$ for which the electrodes are shifted one in relation to the other by one or several teeth, thus by one or several pitches.

All these known devices therefore afford the disadvantage of only enabling measurements of short length to be made with a satisfactory accuracy.

Figure 3:
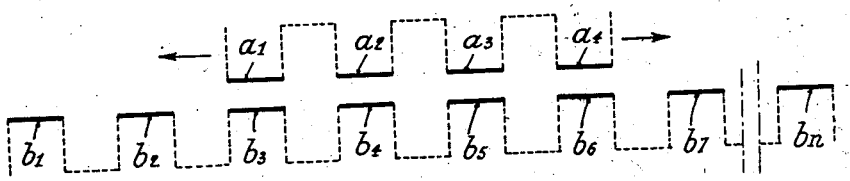
Fig. 3 is a schematic representation of the invention.

According to the invention it is proposed, in the first place, to make use of two crenellated electrodes of different length, i. e. electrodes provided with different numbers of teeth, as shown diagrammatically in Fig. 3. It results that in the course of relative displacements of these two electrodes there exist, whenever the two electrodes are shifted, in relation to each other, by one pitch, periodically recurring zones in which the capacity is identical, and the variation curve of the capacity in terms of the distance then presents the diagrammatical aspect of curve IV, Fig. 1.

This arrangement therefore permits the measurement of lengths as great as desired since in each of the successive sections $A_2, A_3, A_4 \ldots A'_2, A'_3, A'_4 \ldots$ the phenomena are the same as in zone A.

Nevertheless inside each section the accuracy of the measurements remains variable on passing by a minimum at the points $m$ where the tangent to the curve is horizontal and by a maximum at the points M where the tangent shows a maximum slope.

In conformity with a second characteristic of the invention it has proved possible to render this accuracy constant by measuring the relative displacements of the two electrodes, no longer by a reading of the variation of the capacity but by the reading of a relative displacement of a different nature from the original displacement which it is desired to measure and compensating this from the electrical point of view, which has as its effect to maintain the capacity of the apparatus at a constant value, this value corresponding preferably to the value M for which the variations of capacity in terms of the variations of distance are the greatest.

In practice, if the displacement to be measured is rectilinear, the second displacement or compensation displacement may be a rotation; conversely, if the displacement to be measured is an angular one, the compensating displacement may be rectilinear. The crenellated electrodes, instead of being plane or circular, are for this purpose arranged in the form of two helicoidal elements cooperating with one another in the same way as a screw and nut but without physical contact with one another.

The invention is also concerned with a process enabling a correction of mistakes in the mechanical construction of the electrodes (for example irregularities in the pitch of the longest electrodes) and consisting in the local modification of the relative capacity by a mechanical distortion effected at will in a direction preferably different from the displacement to be measured and from the compensation displacement, for example by increasing locally the spacing between the two electrodes.

The invention is therefore concerned with a new electrical circuit for the measurement of capacities.

The machine diagrammatically shown in Fig. 4 consists of a fixed frame 1 on which moves a carriage 2 in which is mounted the measuring device (shown on a larger scale in Fig. 5), consisting essentially of the measuring rod 3 in the form of a helicoidal screw, forming one of the electrostatic elements and sliding without contact inside of the reader 4 which is integral with the frame, having inside a helicoidal thread of the same pitch as that of the rod 3 and forming the second electrostatic element, one at least of these two elements being electrically insulated.

The measuring rod 3 is fitted with a graduated drum 5 which revolves integrally with it and is displaced in front of a reading mark not shown. It carries finally a finger 6 cooperating with a finger 7 integral with the frame, the piece to be measured being placed between these two elements.

It will be apparent from Fig. 4 that the relative displacement of the electrodes in axial direction is limited by the difference in length of the elements 3 and 4; if $a$ be the actual maximum displacement, which is determined by the distance of fingers 6 and 7 in the leftmost position of the carriage 2 and which may be equal to or less than said difference, then the apparatus of Fig. 4 enables measurements of length up to $2a$ by virtue of the provision of two additional fingers 6', 7' the spacing of which equals $a$ in the leftmost position of the carriage. If $x$ be the variable distance between the drum 5 and the reader 4, the spacing between fingers 6 and 7, in any position of the carriage, will be $a-x$ while that between fingers 6' and 7' will be $a + x$, $x$ having any value between 0 and $a$, so that lengths ranging from 0 to $2a$ may be measured; thus, an object P may be inserted either between fingers 6, 7 or between fingers 6', 7', depending on whether its length is less or greater than $a$.

To measure its displacements roughly the carriage has a graduated scale 8 (graduated in millimeters for example) which cooperates with an indicator 9 carried by the measuring rod; each graduation being equal to the amount of the pitch of the parts 3 and 4 or to a multiple or submultiple of this pitch, preferably not less than half a pitch.

There is shown in the drawing a handwheel 10 actuating the carriage and the measuring rod by any mechanical means, not shown, and there are not shown in Fig. 4 the electrical devices which will be described later when referring to Fig. 6. The output thereof is translated for the operator by a galvanometer 11 which is connected to the measuring rod 3 and to the reader 4 and the needle of which is displaced in terms of the relative positions of these two elements under conditions which will be later described.

It will also be stated later by what means the calibration of the apparatus is carried out. It will now be shown how, on the supposition that the apparatus is perfectly calibrated, a measuring operation is carried out.

The piece P to be measured having been placed on the support 12 between the fingers 6 and 7, for example, the handwheel 10 is maneuvered to bring the measuring rod and its finger 6 in contact with the piece P and then to push the latter into contact with the finger 7.

In the course of this displacement the various teeth of the measuring rod 3 pass before the group of teeth of the reader 4, which determines the variations of the electrical capacity between them, the highest values of this capacity being produced each time that the teeth are coincident and the lowest values each time that the teeth of the two organs are shifted a half pitch. In the course of this displacement the needle of the galvanometer 11 oscillates therefore constantly between the zero and a maximum, passing through all the intermediate values.

When contact has been established between the keys 6 and 7 and the piece, the needle will occupy some position which will depend on the relative position of the teeth of the two elements 3 and 4 but which nevertheless, as will be shown later, may be selected and adjusted at will in terms of the accuracy required for the measurement.

The pitch of these elements having a value equal to, or a multiple of, the graduations of the scale 8, if the carriage has been displaced a whole number of pitches, the indicator 9 will be displaced on the scale 8 along a whole number of divisions and the galvanometer needle will recover the position which it occupied originally.

If on the other hand the carriage is displaced by a whole number of pitches increased by a fraction of this pitch, the galvanometer needle will occupy a position different from the original position. To recover the latter and thus measure this fraction of the pitch, the reader and the measuring rod must be given a relative movement different from the longitudinal displacement which is measured and compensating the difference between the capacity noted at the conclusion of this longitudinal displacement and the original capacity. This relative compensation displacement consists, in the example shown, in a relative rotation of the two reading elements, for example, of the rod 3 in relation to the fixed reader 4.

This rotation does not involve any longitudinal displacement of the rod 3 since it is not in mechanical grip with the reader but involves a relative displacement of the teeth of these two organs. It therefore measures effectively the relative longitudinal displacement which would have had to have been imparted to these organs themselves in order to recapture the additional fraction of the pitch.

Various electrical arrangements may be used for the determination of the capacity variations between the measuring rod 3 and the reader 4 and, consequently, the accurate marking of the original position.

There is shown in Fig. 6 a standard Sauty bridge circuit, i. e., a Wheatstone bridge composed of four reactive impedance arms, in combination with the diagrammatically illustrated measuring rod 3 and reader 4 constituting one of the capacities, the galvanometer 11, a generator of alternating current 14, three fixed capacities 15, 16 and 17 and, if required, a small adjustable capacity 18 in parallel with the capacity 15, for example, and enabling the value of the standard capacity to be caused to vary at will, thus permitting adjustment of the marking position of the galvanometer needle.

Various arrangements can be made for increasing the accuracy of the reading. With the circuit which has been described above, the variable capacity $x$ between the reader 4 and the measuring rod 3 is compared with three fixed capacities $a$, $b$, $c$, the Sauty bridge giving for a null current read at 11 the equation $$\frac{x}{a}=\frac{b}{c}$$

It will be realized that greater accuracy is secured if the relative displacements of the reader and of the measuring bar cause to vary two of the elements in the above equation, that is to say if the apparatus has two readers 4 and 4' (Fig. 7) shifted by half a pitch, in such a way that the capacity of one of them increases while that of the other decreases. If the capacity between 4' and 3 is called $y$ the Sauty bridge equation for a null current read at 11 will be $$\frac{x}{y}=\frac{b}{c}$$

A combination can also be provided in which the four capacities of the bridge are variable in terms of the relative displacements of the reader and of the measuring rod. Such a result may be secured by employing a measuring rod with two threads electrically insulated from one another and a reader formed in the same manner.

Such a circuit is shown in Fig. 8 in which the measuring rod consists of two helicoidal turns 3 and 3' insulated electrically from one another, and the reader also consists of two helicoidal turns 4 and 4' electrically insulated from one another. If the capacity between 3 and 4 is called $x$, $y$ the capacity between 3 and 4', $z$ the capacity between 3' and 4 and $t$ the capacity between 4' and 3', the bridge equation will be as follows:

$$\frac{x}{y}=\frac{z}{t}$$

It will be noted that apart from the diminution of space in regard to the arrangement in Fig. 7, the arrangement in Fig. 8 has the advantage that each of the readers plays, in respect to the other, the part of an electric screen while lowering the residual capacity.

Further, when, instead of measuring a variable capacity in comparison with constant capacities, the relative variations of two ratios are measured the four terms of which are variable, any accidental displacement alters the four capacities in the same direction and substantially in the same proportion and is therefore without influence on the accuracy of the measurements. Such is particularly the case when, in the course of the longitudinal displacement to be measured, a throwing off center occurs in the two respectively male and female measuring organs.

The sensitiveness of the device can be still further improved to a great extent by placing on two or four branches of the bridge inductance coils 19 (Fig. 9) calculated in such a manner that the reactance of each of the branches of the bridge increases or decreases more rapidly than the inverse of the capacity. The result is obtained by placing each of the plug circuits forming the branches of the bridge in the neighborhood, on this side or that, of the point of resonance where their reactance becomes infinite.

This process is also applicable not only to the measurement of displacement but to all capacity measurements and to all devices employing a measuring apparatus for these.

The arrangement disclosed may also include known amplification devices, whether mechanical, electrostatic (use of a dielectric with high dielectric constant) or electric (amplification of alternating current or, after detection, amplification of direct current).

In the latter case the apparatus would consist (Fig. 10) of a generator 14 of alternating current, an amplifier 20 of alternating current, a rectifier device 21 and a D.-C. amplifier 22 which controls the reading milliammeter 11, these devices being arranged according to known principles.

The sensitivity can be still further increased by arranging the direct current amplifier in such a way that the arrival of a rectified alternating current causes the milliammeter to tend toward zero or towards a minimum. At this moment the reading is reversed and the reading position will correspond to a maximum while in the standard Sauty bridge it corresponds to zero.

This process offers the advantage that a considerable increase in the power of the generator can be secured and consequently in accuracy, without any fear that the milliammeter needle may leave the graduation.

At the beginning it was shown how the corrections of errors in the apparatus, that is to say the calibration of the apparatus at an exact value for all the relative positions of the reader and of the measurement rod, could be attained by introducing alterations at will in the relative capacity of the two elements (reader and measurement rod); it will now be shown how these corrections are to be made in terms of the nature of the errors and of the points where they occur.

It will be noted in the first place that each of the teeth of the reader can be considered as effecting a separate reading, so that if the reader has $n$ teeth the total capacity measured will be $n$ times the capacity resulting from the correspondence between each of these teeth and the tooth opposite the measuring rod. It follows that if in the case of one tooth, either of the reader or of the measuring rod, there is an accidental cause of error, this will only intervene to an nth. Similarly if there exist on each of the teeth a cause of error, the reading error will be the arithmetical mean of the individual errors. If these errors are of different signs they may even cancel.

If this is not the case it will always be possible to cancel the mean error by a local correction of a single tooth in register. In practice this correction will be made by increasing the space between the teeth by removing of a flat or an arcuate portion of the tooth by some suitable mechanical process, such as grinding, filing, etc. In practice a fairly large number of teeth of the reader will be chosen so that the smallest error observed may be corrected by a deformation of sufficient size to be capable of being carried out mechanically.

The measuring bar and the reader can therefore be manufactured economically on machines for current use without any particular requirements as regards the accuracy or finish of the surfaces.

It will further be noted that the measuring rod alone has to be manufactured with accuracy; the reader can be of any kind without errors appearing since any error resulting from an inexactitude in manufacture is reproduced identically in all the course of displacements of the measuring rod.

Apart from errors resulting from the manufacture of the measuring rod and of the reader, that is to say in the dimensions of their teeth and in the position, other errors may appear owing to the fact that the compensation displacement, for instance the rotation, does not exactly correspond to the longitudinal displacement which it is proposed to compensate. This may be due to the fact that the thread of the measuring rod or of the reader does not progress in a perfectly continuous manner.

These errors cancel themselves, like the accidental pitch errors, when in the successive pitches they are not to be found on the exact multiple points of the pitch, which is most frequently the case.

In the other cases they may be corrected by an electrode of special shape integral with the moving part and displaceable in front of a fixed electrode of corresponding shape, the variable capacity resulting from these two elements adding itself to the original capacity of the two elements. In practice this result may be attained, as shown in Fig. 11, by means of two parallel discs 23 and 24 integral respectively with the movable organ 3 and the carriage 2 thereof and presenting bosses 23a and 24a which momentarily add, once in the course of each rotation (i. e. when these two bosses are in alignment), a further capacity, the shape of these bosses being determined in terms of the conditions under which the error appears. It is to be understood that these two discs which in Fig. 4 have been shown respectively keyed to the finger 6' and fastened to the left-hand outer wall of the carriage, will be connected in parallel with the measurement capacity.

If there exists a slight mechanical play so that the compensation movement does not exactly correspond to the length displacements which it is desired to compensate, it will likewise be possible to make up for it by means of plates or discs such as the discs 23, 24 in Fig. 11, but which, however, may be circular if there are not other errors to compensate. It will be realized that the capacity variation due to the play will thus be compensated by the capacity variation resulting from the variable axial spacing of these discs or plates 23 and 24.

Though measurement effected with the apparatus according to the invention leads finally to the observation of the position of a graduated drum in relation to a mark, as in any mechanical apparatus, the apparatus which has been described presents however numerous advantages as compared with standard micrometers.

In the first place it will be noted that the reader, taking the part of the nut of a micrometer, and the measuring rod, taking the part of the screw, have no material contact with each other, which consequently eliminates any risk of wear of these two organs, so that in consequence the calibration, once obtained in the manner which has been described, remains constant. It has also been seen that this calibration, by correction of the various mechanical errors, is extremely simple and does not require any frictional coupling means.

Further, in mechanical devices the position of reading is determined by a stop which does not show itself in a manner which is always clear to the operator. According to the invention, on the other hand, the position of reading is marked by the position of the needle of the galvanometer the displacement of which is considerably amplified by electrical means, that is to say without inertia and independent of any friction. This enables, for example, by reason of the absence of inertia, the apparatus to be used for the checking of readings on the parts when in motion, the vibrations of the contact piece being integrated electrically in the direct-current amplifier.

Finally the apparatus according to the invention presents, as compared with apparatus for visual reading, the following advantages:

(1) The checking of the same reading being carried out at multiple points by means of a reader with several threads, the probable error will always be much less than the error resulting from the reading of a single mark as is the case with a visual device.

(2) With an optical enlargement the accuracy of the measurements is always dependent upon the visual qualities of the operator and upon the care taken in adjusting the optical settings; this inconvenience disappears when the amplification is electronic.

(3) In the devices for visual reading the limit of accuracy is very quickly reached, for the enlargement is limited to the value for which the guiding line assumes dimensions such that its image ceases to be sharp. In the electrostatic device according to the invention the amplification is only limited by the material dimensions which may be given the reading rod and the reader.

What I claim is:

1. Apparatus for measurements of length by measuring the variations of capacities resulting from the relative parallel displacements of two organs integral respectively with two parallel electrodes, comprising in combination two electrodes in form of discontinuous surfaces having several elements of same length and same pitch forming crenellations, said electrodes having a different number of said elements and being consequently of different length, first means to cause a parallel relative displacement of said electrodes whereby their capacity varies relatively quickly and in the same manner during each relative displacement of one pitch and periodically passes through a predetermined value, second means independent of said first means and operable to cause relatively slow variations of capacity by effecting a relative displacement of said electrodes distinct from said parallel displacement, and means to ascertain the extent of the relative displacement of the electrodes due to said second means which restores the capacity to said predetermined value after displacement of the electrodes by the action of said first means.

2. Apparatus for measurements of length by measuring the variations of capacities resulting from the relative parallel displacements of two organs integral respectively with two parallel electrodes, comprising in combination two parallel helicoidal electrodes of same pitch but different lengths, respectively, male and female, introduced coaxially the one into the other without mechanical contact, first means to cause a parallel relative displacement of said electrodes whereby their capacity varies relatively quickly and in the same manner during each relative displacement of one pitch and passes each time through a predetermined value, second means to cause relatively slow variations of capacity by rotating one electrode with reference to the other, and means to read the extent of the relative rotation of the electrodes due to said second means which restores the capacity to said predetermined value after displacement of the electrodes by the action of said first means.

3. An apparatus as claimed in claim 1, wherein one of the crenellations of the lengthier electrode is deformed relative to the remainder of its crenellations, thereby compensating for inaccuracies of construction.

4. An apparatus for measurements of length by measuring the variations of capacities resulting from the relative parallel displacements of two organs integral respectively with two parallel electrodes, comprising in combination two elongated electrodes in the form of discontinuous surfaces having several elements of same length and same pitch forming crenellations, said electrodes having a different number of said elements and being consequently of different lengths, first means to cause a longitudinal relative displacement of said electrodes whereby their capacity varies relatively quickly and in the same manner during each relative displacement of one pitch and periodically passes through a predetermined value, second means independent of said first means and operable to cause relatively slow variations of capacity by effecting a relative displacement of said electrodes distinct from said longitudinal displacement, a galvanometer connected to the electrodes in order to indicate the predetermined value, a linear scale graduated in an integral number of half-pitches to read the relative longitudinal displacements of said electrodes, and a scale graduated in small fractions of pitches to determine the extent of the relative displacement of the electrodes due to said second means which adjusts the capacity to said predetermined value in any relative longitudinal position of said electrodes.

5. Apparatus as claimed in claim 1, in which the predetermined value of the capacity is substantially the value for which the variation of capacity in relation to the relative displacement of the electrodes is the fastest.

6. Apparatus as claimed in claim 1, in which the predetermined value of the capacity is substantially the mean value between the maximum value corresponding to the coincidence of the crenellations of the two electrodes and the minimum value for which the crenellations of the two electrodes are shifted a half pitch.

7. Apparatus as claimed in claim 2, in which at least one of the two electrodes is formed of two identical groups of crenellations inserted one into the other and electrically insulated, the two variable capacities formed by the simple electrodes and each group of crenellations of the double electrode forming two capacities of a reactive bridge circuit.

8. Apparatus as claimed in claim 2, in which the two electrodes are each formed of two identical groups of crenellations inserted one into the other and electrically insulated, the four variable capacities formed by the two groups of the two electrodes forming the four variable capacities of a reactive bridge circuit.

9. Apparatus as claimed in claim 8, in which the reactive bridge comprises inductances mounted in parallel position with the capacities.

10. Apparatus as claimed in claim 4, including an amplifier inserted in the electrical circuit connecting the variable capacity and the galvanometer, said amplifier being arranged in such a way that the arrival of current causes the indications of said galvanometer to tend towards a minimum.

11. An apparatus for measurements of changes in the relative position of two elements, comprising a pair of coaxial helicoidal electrodes of the same pitch but different lengths radially, physically and electrically separated from each other, mounting means for said electrodes permitting relative axial and relative angular movement, thereof, measuring means operable to impart one of said movements to said electrodes, compensating means operable independently of said measuring means to impart the other of said movements to said electrodes, the pitch of said helicoidal electrodes being such as to cause the capacitance of said electrodes to vary at a relatively fast rate upon said one of said movements and at a relatively slow rate upon said other of said movements, and indicator means for ascertaining said capacitance in each relative position of said electrodes.

12. An apparatus according to claim 11, comprising means for correcting inaccuracies of construction, said means including a pair of auxiliary electrodes forming a condenser, said auxiliary electrodes being secured to said mounting means and to a movable one of said helicoidal electrodes, respectively.

13. An apparatus according to claim 12, wherein said auxiliary electrodes are a pair of coaxial discs.

14. An apparatus according to claim 13, wherein said discs are provided with a pair of bosses registering in a predetermined relative angular position of said discs.

PIERRE BUISSON.

REFERENCES CITED

The following references are of record in the file of this patent:

UNITED STATES PATENTS

| Number | Name | Date |
|---|---|---|
| 1,610,122 | Edenburg | Dec. 7, 1926 |
| 1,735,889 | Blough et al. | Nov. 19, 1929 |
| 1,946,924 | Allen et al. | Feb. 13, 1934 |
| 2,004,361 | Arms et al. | June 11, 1935 |
| 2,081,738 | Conover et al. | May 25, 1937 |
| 2,083,759 | Temple | June 15, 1937 |
| 2,146,442 | Price | Feb. 7, 1939 |
| 2,476,410 | Gardiner | July 19, 1949 |

FOREIGN PATENTS

| Number | Country | Date |
|---|---|---|
| 343,162 | Italy | Sept. 16, 1936 |
| 556,073 | Great Britain | Sept. 20, 1943 |